United States Patent Office 2,809,960
Patented Oct. 15, 1957

2,809,960

PREPARATION OF WATER-SOLUBLE SULFONATION PRODUCTS OF POLYMERIC AR-VINYLTOLUENES

Harold H. Roth, Bay City, Mich., assignor to The Dow Chemical Company, Midland, Mich., a corporation of Delaware No Drawing. Application November 24, 1954, Serial No. 471,124

8 Claims. (Cl. 260—79.3)

This invention relates to the preparation of water-soluble sulfonates of polymeric ar-vinyltoluenes. It pertains especially to an improved method for making water-soluble sulfonates by reaction of chlorosulfonic acid-containing sulfonation agents on polymerized ar-vinyltoluenes wherein the reaction mixture is heterogeneous and the polymeric ar-vinyltoluene reactant is in a state of very fine subdivision.

There have previously been described methods for the sulfonation of polystyrene and related polymeric resins with chlorosulfonic acid as the sulfonation agent, whereby resin sulfonates ranging from products soluble in water to products insoluble in water are obtained. The preferred methods for making water-soluble sulfonated resins have employed sulfur trioxide, or a complex thereof, as the sulfonation agent. These preferred methods are generally carried out by admixing the sulfur trioxide sulfonation agent and the resin starting material while having the reactants dissolved in an inert liquid solvent diluent such as a chlorinated aliphatic hydrocarbon or liquid sulfur dioxide and employing such a quantity of the liquid diluent that the concentration of resin sulfonate product in the resulting reaction mixture is extremely low. A typical known procedure for making a water-soluble resin sulfonate is as follows. From 0.8 to 3 molecular equivalents of sulfur trioxide are admixed with one equivalent of a polystyrene resin while having the latter dissolved in carbon tetrachloride and while maintaining the mixture at reaction temperatures between —20° and 35° C., the combined weight of the sulfur trioxide and the polystyrene starting materials being such as correspond to from 1 to 5 percent by weight of the whole reaction mixture. Other suitable solvents for the polystyrene are methylene chloride, tetrachloroethylene, ethylene dichloride, and 1,1,1-trichloroethane. The sulfur trioxide can also be employed in the form of a complex compound with a suitable ether, e. g., dioxane or bis(betachloroethyl)ether.

Processes such as those just described have not been entirely satisfactory, in part because of the requirements that the resin starting material be dissolved in a suitable solvent to make a solution and that large proportions of inert liquid diluents be employed. The operation of dissolving the resin in the solvent is time-consuming and the large amounts of solvent that must be handled and recovered for recycling add to the cost of manufacture. Also the solvent occupies a major part of the reaction space; hence, the productive capacity per unit volume of the reactor is undesirably low.

It is an object of this invention to provide a method for sulfonation of a polymeric resin, whereby water-soluble polymer resin sulfonates can be obtained without the necessity of preparing a solution of the polymeric resin starting material.

A further object is to provide such a method wherein the proportion of polymer resin sulfonic acid in the sulfonation reaction mixture can be considerably greater than 5 percent, e. g. up to 10 or more percent by weight of the entire reaction mixture.

A more specific object is to provide such a method for sulfonation of polymeric ar-vinyltoluenes, whereby water-soluble sulfonates of polymeric ar-vinyltoluenes can be obtained, wherein a solid polymeric ar-vinyltoluene starting material is reacted with a chlorosulfonic acid-containing sulfonation agent in the presence of liquid sulfur dioxide to obtain a reaction mixture containing from about 1 to about 10, advantageously from 5 to 10, percent of its weight of the polymeric ar-vinyltoluene sulfonic acid reaction product.

Other objects and advantages of the invention are evident in the following description.

The objects of this invention are attained in a method, more particularly described hereinafter, wherein a solid polymeric ar-vinyltoluene, in a very fine state of subdivision, is admixed with a liquid solution containing a chlorosulfonic acid sulfonation agent and liquid sulfur dioxide.

Suitable finely divided polymeric ar-vinyltoluenes for practice of this invention comprise polymer particles whose average diameters are not more than 10 microns, preferably from about 0.05 to about 5 microns, and loosely bound aggregates of such particles, the average diameters of such aggregates being not more than about 15 microns, e. g. from about 1 to about 15 microns. The polymer particles referred to can be generally rounded particles such as are characteristically formed by emulsion polymerization and which have a nearly spherical particle shape. For these particles, the term "diameter" has its customary meaning. The aggregates of these particles resemble clusters of grapes and are often irregular in shape. For such an aggregate, the term "diameter" expresses the overall size of the aggregate cluster in terms of the diameter of a sphere having approximately the same volume as that of the cluster. Suitable polymer particles can be ground or crushed particles having irregular shapes. For such particles, the term "diameter" is taken to mean the approximate mean straight line dimension through the center of the particle.

Such finely divided polymeric ar-vinyltoluenes can be made by known methods, e. g. by grinding or crushing larger masses of solid polymer, by atomizing liquid solutions of the polymer and by atomizing the molten polymer. A particularly satisfactory procedure for obtaining the finely divided polymer solid required for the present sulfonation process is to polymerize a polymerizable composition comprising monomeric ar-vinyltoluene while dispersed in an aqueous medium to produce a stable colloidal dispersion of the polymeric resin and thereafter to separate from the dispersion a dry, aggregated polymer solid in the form of extremely small particles as herein specified.

Suitable methods are already known for polymerizing monomeric ar-vinyltoluene in aqueous emulsion to produce stable suspensions of colloidally dispersed polymer particles having average diameters of less than about 1.0 micron, e. g. from 0.05 to 0.5 micron. Also, suitable methods are already known for treating such colloidal dispersions so as to obtain therefrom dry, aggregated polymer solids containing polymer particles of a kind just stated in the form of aggregates whose average diameters are not greater than about 15 microns, e. g. from about 1 to about 15 microns. Such a dry, aggregated polymer solid can be obtained from a suitable dispersion in the usual manner by coagulating the dispersed particles, e. g. by freezing or by addition of electrolytes, separating the coagulum from the aqueous serum, and drying the coagulum. Preferably, a dry, aggregated polymer solid, suitable for use in the process of this invention is obtained by spray-drying a suitable aqueous dispersion by already known procedures.

Solid polymer particles and aggregates of particles within the range of size just specified can readily be sulfonated by the method herein described to produce water-soluble polymer sulfonates. Attempts to employ polymer particles and aggregates of particles substantially larger than those specified usually results in the formation of polymer sulfonates which are at least partially insoluble, or only swollen, in water, probably because of incomplete sulfonation of the interior of large particles of polymer or because of a greater degree of formation of cross-linkages, e. g., sulfone-type cross linkages, between the polymer molecules during the sulfonation.

The polymerized ar-vinyltoluenes to which this invention is preferably applied are polymeric resins containing, in chemically combined form, a predominate proportion, e. g. 60 or more percent by weight, of at least one ar-vinyltoluene, i. e. a nuclear methyl styrene, such as o-vinyltoluene m-vinyltoluene, and p-vinyltoluene. The polymer can consist essentially of one such ar-vinyltoluene or can be a copolymer of two or more of the isomeric ar-vinyltoluenes. The polymerized ar-vinyltoluenes can also contain, chemically combined therein, a minor proportion, e. g. up to about 40 percent by weight, of one or more other polymerizable monovinylidene compounds such as styrene, alpha-methylstyrene and other monoalkenylaromatic compounds, methyl methacrylate, ethyl acrylate and other esters of acrylic and methacrylic acids, maleic anhydride, acrylonitrile, methacrylonitrile, vinyl esters, vinyl halides, vinylidene halides, vinyl ethers, vinyl ketones and olefins such as ethylene and isobutylene. The polymers must be soluble in usual polymer solvents such as toluene, dioxane, or methyl ethyl ketone, and be substantially free of chemical crosslinkages.

The sulfonation agent employed consists of, or contains, chlorosulfonic acid. In addition to the chlorosulfonic acid, or in partial substitution therefor, there can be employed another strongly active sulfonation agent such as sulfur trioxide or stable ether complexes of sulfur trioxide, provided that the sulfonation agent contain at least 10 mole percent chlorosulfonic acid and, correspondingly, not more than 90 mole percent sulfur trioxide.

In order to obtain water-soluble sulfonated resins by the practice of this invention, it is usually desirable to select a polymeric resin starting material whose molecular weight is related to the composition of the sulfonation agent to be used. In general, as the molecular weight of a polymeric resin increases, the viscosity of a water solution of the sulfonate resulting from a particular sulfonation process also increases until a region is reached where the product is no longer considered to be soluble, due to its gel-like character. Since chlorosulfonic acid generally causes the occurrence of more crosslinking reactions between polymer molecules during sulfonation than does sulfur trioxide, the viscosity of a solution in water of a product resulting from the sulfonation of a particular resin is generally greater the greater is the proportion of chlorosulfonic acid relative to sulfur trioxide in a sulfonation agent comprising a mixture of the same. For example, in order to obtain a water-soluble resin sulfonate using chlorosulfonic acid alone as a sulfonation agent, it is usually desirable to employ a polymeric ar-vinyltoluene starting material whose molecular weight corresponds to that of a polymer whose solution in nine times its weight of toluene has a viscosity at a temperature of 25° C. of not more than about 10 centipoises. Water-soluble resin sulfonates can be maintained using mixtures of chlorosulfonic acid and sulfur trioxide by employing polymeric ar-vinyltoluene starting materials whose average molecular weights are not in excess of maxima which are inversely proportionate to the proportion of chlorosulfonic acid in the mixtures thereof with sulfur trioxide used as sulfonation agent. For example, a mixture of chlorosulfonic acid and sulfur trioxide containing 10 mole percent chlorosulfonic acid can be employed as sulfonation agent to obtain water-soluble sulfonates from polymeric ar-vinyltoluene starting materials having molecular weights corresponding to that of a polymer whose solution in nine times its weight of toluene has a viscosity at a temperature of 25° C. of up to about 40 centipoises.

In practice of the invention, a suitable finely divided polymeric ar-vinyltoluene of the kind hereinbefore specified is admixed with a liquid solution comprising chlorosulfonic acid and liquid sulfur dioxide at a reaction temperature between about −20° C. and about +40° C. with vigorous agitation. Usually, the finely divided polymer is fed into the reaction mixture containing the chlorosulfonic acid sulfonation agent, or the finely divided polymer and the chlorosulfonic acid culfonation agent are fed concurrently to the reaction zone. In the latter procedure, the sulfonation agent can be diluted with a portion of the liquid sulfur dioxide employed as a medium for the reaction and the reactants, i. e. the finely divided polymer starting material and the sulfonation agent, are fed to a reaction zone containing another portion of liquid sulfur dioxide or a portion of the sulfonation reaction mixture. The process can be made continuous by withdrawing a portion of the sulfonation reaction mixture while continuing to feed the polymer starting material and the sulfonation agent to the reaction zone.

The dry, finely divided polymer solid starting material can be sprinkled onto the surface of the liquid reaction mixture or be suspended in a chemically inert, non-solvent gas such as dry air or nitrogen and be blown into the sulfonation reaction mixture. The dry, finely divided polymer solid can also be suspended in a portion of the liquid sulfur dioxide and the resulting suspension be added to the sulfonation reaction mixture, provided that the suspension be prepared under such conditions and utilized so promptly after preparation that no appreciable swelling or solution of the polymer is permitted to occur before the polymer is subjected to the sulfonation reaction.

With sulfur dioxide as the reaction medium, it is convenient to carry out the process at a temperature of about −10° C., i. e. at the atmospheric boiling point of sulfur dioxide, under reflux. The reaction can be carried out at lower temperatures, down to about −20° C., and at higher temperatures, up to about +40° C., under pressure. For convenience in handling the evolved hydrogen chloride it it usually preferred to operate at atmospheric pressure. The resulting low temperature of operation at atmospheric pressure is further advantageous in reducing the degree of crosslinking reaction.

The sulfonation agent and polymeric ar-vinyltoluene are used in such amounts as correspond to at least 0.7, usually from 0.7 to about two, molecular proportions of sulfonation agent for each molecular proportion of monomeric compound chemically combined in the polymer, although the molecular ratio of sulfonation agent to monomeric compound in the polymer can be as large as desired, e. g., ten or more. There are thereby formed polymeric ar-vinyltoluene sulfonic acids in which are an average of from 0.7 to 2 sulfonic acid groups per benzene nucleus.

The amount of liquid sulfur dioxide which is usually employed is such as corresponds to from 90 to 99 percent by weight of the whole reaction mixture, i. e., so that the weight of the polymeric ar-vinyltoluene sulfonic acid product is from 1 to 10 percent of the weight of the whole reaction mixture.

The polymeric ar-vinyltoluene can be added to the reaction mixture as rapidly as desired, provided that good dispersion of the polymeric solid into the reaction mixture is obtained. Usually, it is preferred to feed the polymer starting material slowly, e. g. over a period of from one-half hour to several hours, in order to avoid the formation of large clumps of solid matter in the reaction mixture. Sulfonation of the extremely fine particles of solid polymer, to produce a resin sulfonate product which is insoluble in the sulfonation reaction mixture, occurs so rapidly that the polymer particles are prevented from dissolving in the liquid reaction mixture, even though the polymer starting material is ordinarily soluble or dispersible in the liquid sulfur dioxide alone in the absence of the sulfonation agent. After the complete admixing of the polymer starting material and the sulfonation agent, it is preferable to allow the resulting mixture to stand, with continued agitation, for a time such as from one-half hour to one hour or more before separating out the polymer sulfonate.

The sulfonation of polymeric ar-vinyltoluene as just described results in the formation of a suspension of swollen granules of polymeric resin sulfonate in a liquid medium. This suspension can be separated in usual ways, such as by filtering or centrifuging, and the solid washed with a fresh portion of the liquid sulfur dioxide or with some inert organic liquid such as a chlorinated aliphatic hydrocarbon or an ether such as diethyl ether. The resin sulfonic acid can then be dried in the usual manner, preferably out of contact with water vapor, usually under vacuum.

The sulfonated ar-vinyltoluene resins so obtained are water-soluble acids which can be employed as such or converted into water-soluble salts by reaction with alkalies such as ammonia, amines and alkali metal bases, e. g. sodium hydroxide and potassium hydroxide. Uses for such polymer sulfonates are known, such as in treatment of textiles, in the preparation of dispersions and emulsions, and in conditioning of agricultural soils.

The following examples illustrate the invention, but should not be construed as limiting its scope. In the examples, parts and percentages are by weight unless otherwise noted.

*Example 1*

A copolymer of 96 percent ar-vinyltoluene and 4 percent acrylonitrile was made by emulsion polymerization and the resulting stable aqueous dispersion of polymer was spray-dried to obtain a very finely divided dry solid polymer. In that material the ultimate particles were about 0.25 micron in diameter and the aggregates of those particles were from about 1.5 to about 5 microns in diameter. A 10 percent solution of a portion of that copolymer in toluene had a viscosity of 7 centipoises at 25° C.

Twenty-five grams of that finely divided copolymer solid was added over a period of six minutes to a liquid solution of 21 mls. of chlorosulfonic acid and 500 mls. of liquid sulfur dioxide at a temperature of −10° C. under reflux. Agitation was continued for 30 minutes thereafter and the resulting slurry was filtered. The solid resin sulfonic acid was washed with ether and dried under vacuum. One gram of the dry resin sulfonic acid, dissolved in water, required 4.4 mls. of 1.0 N sodium hydroxide solution to effect neutralization. A water solution containing 0.5 percent by weight of the neutral sodium salt of the resin sulfonic acid had a viscosity at 25° C. of 30 centipoises.

*Example 2*

A dry finely divided polymerized ar-vinyltoluene was made by spray-drying a stable aqueous colloidal dispersion of the polymer made by emulsion polymerization of monomeric ar-vinyltoluene. A portion of this polymer, dissolved in nine times its weight of toluene, had a viscosity at 25° C. of 17.09 centipoises. The finely divided dry solid polymer comprised beads having average diameters of about 0.4 micron and clusters or aggregates thereof having average diameters from 1 to 5 microns.

Twenty-five grams of that polymerized ar-vinyltoluene was added slowly to a liquid solution of 500 mls. of liquid sulfur dioxide and 0.75 molecular proportion of chlorosulfonic acid and 0.75 molecular proportion of sulfur trioxide, each based on one molecular proportion of ar-vinyltoluene in the polymer starting material, the mixture being under reflux at a temperature of −10° C. The resulting slurry of resin sulfonic acid was filtered. The solid was washed with ether and dried under vacuum. The polyvinyltoluene-sulfonic acid was soluble in water. A solution in water of 0.5 percent of the neutral sodium salt of the polymer sulfonic acid had a viscosity at 25° C. of 28 centipoises.

*Example 3*

The procedure of Example 2 was carried out by adding another 25-gram portion of the same finely divided spray dried polymer described therein to a liquid solution of 500 mls. of liquid sulfur dioxide and a mixture of 1.1 molecular proportions of chlorosulfonic acid and 0.4 molecular proportion of sulfur trioxide for each molecular proportion of ar-vinyltoluene in the polymer starting material, the reaction mixture being under reflux at a temperature of about −10° C.

The resulting slurry was filtered and the solid resin sulfonic acid was washed with ether and dried under vacuum. The polyvinyltoluene sulfonic acid was soluble in water. A solution in water of 0.5 percent of the neutral sodium salt of the polymer sulfonic acid had a viscosity at 25° C. of 175 centipoises.

*Example 4*

The spray-dried copolymer of 96 percent ar-vinyltoluene and 4 percent acrylonitrile, previously described in Example 1, was sulfonated by adding 50 grams of that copolymer over a period of about 15 minutes to a liquid solution of 500 mls. liquid sulfur dioxide and 42 mls. chlorosulfonic acid at about −10° C. The solid resin sulfonic acid was collected on a filter, washed with ethyl ether and dried under vacuum. One gram of the dry resin sulfonic acid, dissolved in water, required 4.9 mls. of 1.0 N sodium hydroxide solution to effect neutralization. A water solution containing 0.5 percent of the neutral sodium salt of the resin sulfonic acid had a viscosity at 25° C. of 29 centipoises.

I claim:

1. A method for the preparation of water-soluble sulfonates, which method comprises admixing, at a sulfonation reaction temperature between −20° and +40° C. and with agitation, in the presence of liquid sulfur dioxide, a sulfonation agent which consists of at least 10 mole percent chlorosulfonic acid and not more than 90 mole percent sulfur trioxide and a dry solid polymer of ar-vinyltoluene in a finely divided form consisting essentially of particles having average diameters not greater than about 10 microns and aggregates of such particles, the average diameter of such aggregates being not greater than about 15 microns, in amounts corresponding to at least 0.7 molecular proportions of sulfonation agent for each molecular proportion of monomeric compound chemically combined in the polymer, said polymer being substantially free of crosslinkages and containing at least 60 percent by weight of at least one ar-vinyltoluene chemically combined therein, the polymer being one whose solution in nine times its weight of toluene has a viscosity at 25° C. not greater than a maximum in the range from 10 centipoises to 40 centipoises, the maximum within said range being inversely proportional to the proportion of chlorosulfonic acid in the sulfonation agent.

2. A method according to claim 1 wherein the dry solid polymer of ar-vinyltoluene in finely divided form is obtained from a stable aqueous dispersion of that polymer.

3. A method according to claim 1 wherein the weight of the resulting polymer sulfonic acid is from about 5 to about 10 percent of the weight of the whole reaction mixture.

4. A method according to claim 1 wherein the operations are carried out by adding the dry solid polymer of ar-vinyltoluene in finely divided form to a liquid solution containing liquid sulfur dioxide and the sulfonation agent.

5. A method according to claim 1 wherein the operations are carried out by feeding the dry solid polymer of ar-vinyltoluene in finely divided form concurrently with the sulfonation agent to a reaction zone containing liquid sulfur dioxide.

6. A continuous method according to claim 1 wherein a portion of the resulting reaction mixture is continuously withdrawn from the reaction zone while feeding of the dry solid polymer of ar-vinyltoluene and a liquid solution containing chlorosulfonic acid and liquid sulfur dioxide to the reaction zone is continued.

7. A method according to claim 1 wherein the sulfonation agent consists of chlorosulfonic acid and the dry solid polymer of ar-vinyltoluene is one whose solution in nine times its weight of toluene has a viscosity at 25° C. or not more than 10 centipoises.

8. A method for the preparation of water-soluble sulfonates, which method comprises admixing, at a sulfonation reaction temperature between −20° and +40° C. and with agitation, in the presence of liquid sulfur dioxide, a sulfonation agent which consists of at least 10 mole percent of cholorsulfonic acid and not more than 90 mole percent of sulfur trioxide and a dry solid polymer of ar-vinyltoluene in finely divided form consisting essentially of particles having average diameters not greater than about 1.0 micron and aggregates of such particles, the average diameter of such aggregates being not more than about 15 microns, in amounts corresponding to at least 0.7 molecular proportion of sulfonation agent for each molecular proportion of monomeric compound chemically combined in the polymer, said polymer containing at least 60 percent by weight of at least one ar-vinyltoluene chemically combined therein, the polymer being one whose solution in nine times its weight of toluene has a viscosity at 25° C. not greater than a maximum in the range from 10 centipoises to 40 centipoises, the maximum within said range being inversely proportional to the proportion of chlorosulfonic acid in the sulfonation agent.

References Cited in the file of this patent
UNITED STATES PATENTS

| 2,645,621 | D'Alelio | July 14, 1953 |
| 2,691,644 | Roth | Oct. 12, 1954 |